US009982845B2

(12) United States Patent
Drønen

(10) Patent No.: US 9,982,845 B2
(45) Date of Patent: May 29, 2018

(54) DEVICE AND METHOD FOR SCALING REDUCTION IN A DEAD WATER ZONE OF A FLUID CONDUIT

(71) Applicant: Scale Protection AS, Harstad (NO)

(72) Inventor: Ole Magnar Drønen, Harstad (NO)

(73) Assignee: Scale Protection AS, Harstad (NO)

( * ) Notice: Subject to any disclaimer, the term of this patent is extended or adjusted under 35 U.S.C. 154(b) by 0 days. days.

(21) Appl. No.: 15/309,678

(22) PCT Filed: Jun. 3, 2014

(86) PCT No.: PCT/NO2014/050090
§ 371 (c)(1),
(2) Date: Nov. 8, 2016

(87) PCT Pub. No.: WO2015/187026
PCT Pub. Date: Dec. 10, 2015

(65) Prior Publication Data
US 2017/0138540 A1    May 18, 2017

(51) Int. Cl.
F15D 1/04    (2006.01)
F17D 1/20    (2006.01)
F15D 1/06    (2006.01)
F16L 55/027  (2006.01)

(52) U.S. Cl.
CPC ............ *F17D 1/20* (2013.01); *F15D 1/06* (2013.01); *F16L 55/02736* (2013.01)

(58) Field of Classification Search
CPC ......... F15D 1/02; F15D 1/04; F16L 55/02736
USPC .......... 138/37, 40, 42, 44, 39; 366/377–339; 366/337–339
See application file for complete search history.

(56) References Cited

U.S. PATENT DOCUMENTS

| 3,286,992 A * | 11/1966 | Armeniades .......... B01F 5/0615 138/42 |
| 3,582,045 A * | 6/1971 | Leybourne, III ..... B01F 5/0614 138/38 |
| 3,835,015 A | 9/1974 | Gary |
| 3,919,068 A | 11/1975 | Gary |
| 3,953,002 A * | 4/1976 | England, Jr. ............. B01F 3/10 261/76 |
| 4,179,222 A * | 12/1979 | Strom ..................... F28F 13/12 138/38 |

(Continued)

FOREIGN PATENT DOCUMENTS

| CN | 201412679 | 2/2010 |
| CN | 201412680 | 2/2010 |

(Continued)

OTHER PUBLICATIONS

Norwegian Search Report, Norwegian Patent Application No. 20130164, dated Aug. 22, 2013.

(Continued)

*Primary Examiner* — Patrick F Brinson
(74) *Attorney, Agent, or Firm* — Andrus Intellectual Property Law, LLP

(57) ABSTRACT

A scale-dampening or scale-inhibiting device is at a radial restriction in a pipeline. A helical flow guide is arranged in a pipeline portion upstream of the restriction. The flow guide projects radially inwards from a pipe wall and has a longitudinal direction slanted relative to the center axis of the pipeline. A method is for dampening or inhibiting scaling in a dead zone of a fluid flow downstream of a restriction in a pipeline.

8 Claims, 2 Drawing Sheets

(56) References Cited

U.S. PATENT DOCUMENTS

| | | | | |
|---|---|---|---|---|
| 4,522,504 | A * | 6/1985 | Greverath | B01F 5/0615 138/40 |
| 4,824,614 | A * | 4/1989 | Jones | B01F 5/0617 137/561 A |
| 5,525,242 | A * | 6/1996 | Kerecz | B01F 3/04099 210/220 |
| 5,758,967 | A | 6/1998 | King | |
| 6,840,281 | B1 * | 1/2005 | Amidzich | B67D 1/14 138/37 |
| 7,140,394 | B2 * | 11/2006 | Eveleigh | G05D 23/1346 138/39 |
| 8,322,381 | B1 * | 12/2012 | Glanville | B01F 5/0616 138/37 |
| 2005/0185508 | A1 * | 8/2005 | Schulz-Hanke | B01F 1/0027 366/336 |
| 2008/0037366 | A1 * | 2/2008 | Smith | F15D 1/001 366/337 |

FOREIGN PATENT DOCUMENTS

| | | |
|---|---|---|
| DE | 202004013575 | 5/2005 |
| GB | 1358330 | 7/1974 |
| WO | 1995018923 | 7/1995 |
| WO | 1998005872 | 2/1998 |

OTHER PUBLICATIONS

International Search Report, PCT/NO2014/050090, dated Dec. 15, 2014.

International Written Opinion, PCT/NO2014/050090, dated Dec. 15, 2014.

* cited by examiner

DEVICE AND METHOD FOR SCALING REDUCTION IN A DEAD WATER ZONE OF A FLUID CONDUIT

FIELD

A scale-dampening or scale-inhibiting device at a radial restriction in a pipeline is described.

A method of dampening or inhibiting scaling in a dead zone of a fluid flow downstream of a restriction in a pipeline is described as well.

BACKGROUND

In oil and gas production, scaling in the production fluid flow creates in part great problems and requires costly measures for the conveying capacity of the pipeline to be maintained. The scaling is formed by crystallized substances entrained in the production fluid, for example carbonates, being deposited on surfaces in the pipeline. It is common knowledge that the scaling occurs in particular in turbulent areas and in dead-water zones, that it to say in areas where the geometry brings about a reduced flow rate. This is due to the fact that the scaling intensity is governed by two mutually counteracting processes, namely a) electrochemical forces pulling the crystals towards the pipeline surfaces and b) the fluid flow pulling on the crystals. In zones with vigorous fluid flow, the flow-induced forces are dominant so that scaling is prevented, whereas the electrochemical forces are dominant where the fluid flow is reduced, which may result in scaling.

It is therefore an advantage if a pipeline creates dead-water zones to the least possible degree, for example by there being, to the least possible degree, sharp restrictions that create turbulent flow with adjacent stagnant fluid. Even if this is known to a person skilled in the art, pipelines will often be provided with such critical restrictions, especially in connection with valves. In addition to the fact that scaling at a valve affects the conveying capacity of the pipeline, scaling at a valve may, moreover, affect the ability of the valve to shut off the fluid flow, and, at worst, scaling in the valve may lead to the valve becoming inoperative. This may particularly apply to valves that are very rarely readjusted. A dead-water zone appears in particular downstream of the restriction, on the lee side, that is. FIG. 1 illustrates a simulation of flow velocity around the lee side of a restriction, that is to say downstream of the restriction.

SUMMARY

The invention has for its object to remedy or reduce at least one of the drawbacks of the prior art or at least provide a useful alternative to the prior art.

The object is achieved through features, which are specified in the description below and in the claims that follow.

The term "pipeline" is substantially used about any component surrounding a portion of a flow path for a fluid, the term not being restricted to what usually falls under the term "pipe", "pipeline" and the like.

The invention provides scale-dampening or scale-inhibiting means arranged at a restricted portion of a pipeline, more particularly by said means providing a peripheral flow-velocity component for the fluid flowing in the pipeline. The peripheral flow-velocity component together with a relevant axial flow-velocity component forms an actual flow rate for a given location. The actual flow rate brought about in a typical dead zone may be 10-100 times the flow rate in the dead zone when the restricted portion is not provided with scale-dampening or scale-inhibiting means. What flow rate is required in order to prevent scaling will depend on several factors, for example the chemical attraction-force potential of the crystals, the viscosity and chemical composition of the fluid.

The scale-dampening or scale-inhibiting means must be arranged upstream of the restricted portion of the pipeline, for example a valve, which is to be protected, and the means may be formed as one or more helical, elongated elements which is/are arranged with its/their longitudinal direction in the axial direction of the pipeline and project(s) from the wall of the pipeline inwards, in a radial direction towards the centre of the pipeline. The helical elongated element may form a wall that divides the pipeline into several paths. The pipeline portion will thereby form two flow paths winding in the axial direction of the pipeline portion. Alternatively, the scale-dampening or scale-inhibiting means may be formed as radial elevations that project in a radial direction inwards from the wall of the pipeline, the centre portion of the pipeline having a through-going free path.

In a first aspect, the invention relates more specifically to a scale-dampening or scale-inhibiting device at a radial restriction in a pipeline, characterized by at least one helical flow guide being arranged in a pipeline portion upstream of the restriction, the flow guide projecting radially inwards from a pipe wall and having a longitudinal direction slanted relative to the centre axis of the pipeline.

The flow guide may form a wall that provides two separate flow paths in the pipeline portion.

Alternatively, the smallest diameter of the flow guide may maximally be equal to the diameter of the radial restriction.

The pitch of the flow guide(s) may decrease in the direction of the restriction.

In a second aspect, the invention relates more specifically to a method of dampening or inhibiting scaling in a dead zone in a fluid flow downstream of a restriction in a pipeline, the fluid flow exhibiting an axial flow velocity, characterized by the method including the following step:

by means of at least one flow guide, providing a peripheral flow velocity at least on a lee side of the restriction.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
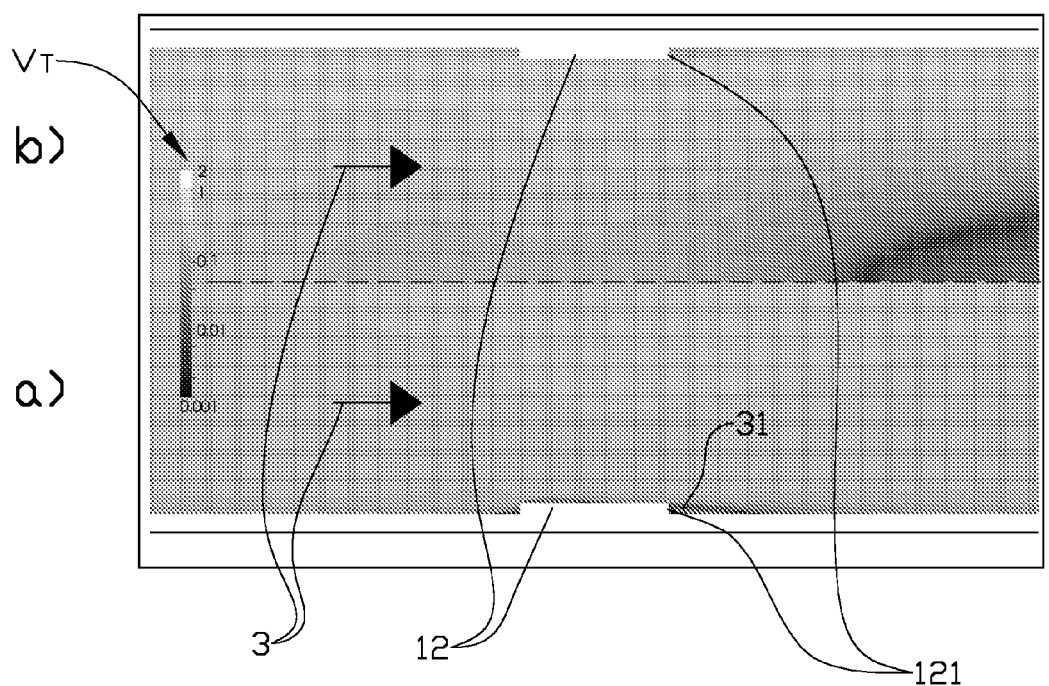
FIG. 1 shows a graphical representation of the simulated, resulting flow rate of a fluid flow at a restriction in a pipeline, the lower part a) showing the resulting flow rate without any scale-dampening or scale-inhibiting measures, and the upper part b) showing the effect of providing scale-dampening or scale-inhibiting means according to the invention upstream of the restriction.

In the drawings, the reference numeral 1 indicates a pipeline including a restriction 12 in a flow path 13 for a fluid flow 3. On a lee side 121 of the restriction 12, that is to say downstream of the restriction 12, a dead zone 31 is brought about in the fluid flow, that is to say a zone in which a flow rate $V_T$ is approximately zero according to the prior art (see FIG. 1a).

Figure 2:
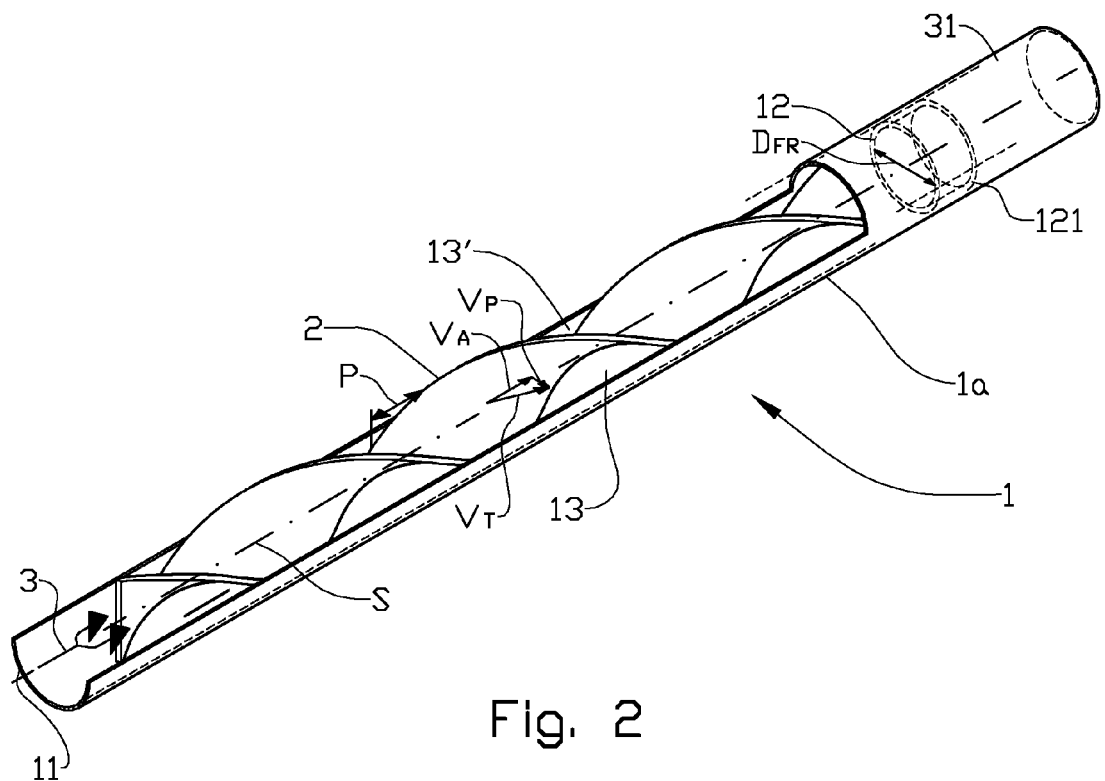
FIG. 2 shows, in a perspective and partially cutaway view, a portion of a pipeline provided with a first embodiment of the invention, a diametrical, helical wall extending in the axial direction in a portion of the pipeline.

In a first embodiment of the invention (see FIG. 2), a scale-dampening or scale-inhibiting means is provided in the form of a helical flow guide 2 which forms a diametrical wall that winds in the axial direction in a pipeline portion 1a upstream of the restriction 12. The flow-guiding wall 2 and pipe wall 11 define two separate flow paths 13, 13', which, because of the helical shape of the flow guide 2, provide a flow velocity component $V_P$ in the peripheral direction of the pipeline 1. Downstream of the flow guide 2, the peripheral flow velocity $V_P$ gradually decreases, and the flow guide 2 is therefore arranged in the immediate vicinity of the restriction 12. In any location in the pipeline 1, the vector sum of the peripheral velocity $V_P$ and an axial flow velocity $V_A$ constitutes a resulting flow rate $V_T$.

Figure 3:
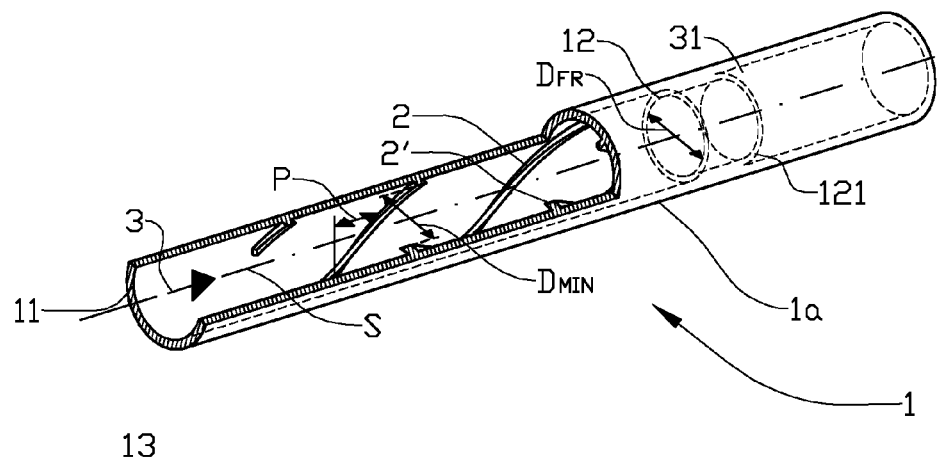
FIG. 3 shows, in a perspective and partially cutaway view, a portion of a pipeline provided with a second embodiment of the invention, several radial elevations, projecting inwards from a pipe wall, extending in the axial direction in a portion of the pipeline.

In a second embodiment of the invention (see FIG. 3), several scale-dampening or scale-inhibiting means are provided in the form of helical flow guides 2, 2' that project inwards from the pipe wall 11 and are substantially evenly distributed in the periphery of a flow path 13. The flow guides 2, 2' exhibit a height, that is to say an internal diameter $D_{MIN}$, which, maximally, is equal to the internal diameter $D_{FR}$ of the restriction. In FIG. 3, the flow guides 2, 2' project further into the flow path 13 than the restriction 12.

When a fluid flow 3 is provided in the pipeline 1, the flow guide(s) 2, 2' bring(s) about a peripheral velocity component $V_P$ in the flow 3. This leads to a far higher resulting flow rate $V_T$ being provided on the lee side 121 of the restriction 12 than on the lee side 121 of a restriction 12 where the pipeline 1 is not provided with one or more flow guides 2, 2', see FIG. 1a in comparison with FIG. 1b.

The peripheral flow velocity $V_P$ on the lee side 121 of the restriction 12 is affected by, among other things, the flow rate of the fluid 3 at the entrance to the pipeline portion 1a, which is provided with one or more flow guides 2, 2', the distance between the flow guide(s) 2, 2' and the lee side 121 of the restriction 12, the difference between the internal diameters of the restriction 12 and the flow guide(s) 2, 2', the pitch P of the flow guide(s) 2, 2', especially the pitch P at the downstream end of the flow guide(s) 2, 2', and the viscosity of the fluid 3.

The flow rates indicated in the figures are examples of how the flow guide(s) 2, 2' give(s) a positive effect on the flow rate downstream of the restriction 12. The flow rate that is necessary to prevent scaling is obtained from trials and experience with well fluids of different chemical compositions, and the design of the flow guide(s) 2, 2', for example the pitch P, is selected on the basis of what radial flow velocity component $R_R$ is desirably to be achieved at a specific fluid flow.

The invention claimed is:

1. A scale-dampening or scale-inhibiting device at a radial restriction in a pipeline wherein at least one continuous helical flow guide is arranged in a pipeline portion upstream of the radial restriction, the at least one continuous helical flow guide projecting radially inwards from a pipe wall and having a longitudinal direction slanted relative to a center axis of the pipeline, and wherein the at least one continuous helical flow guide forms a wall that provides two separate flow paths in the pipeline portion.

2. The scale-dampening or scale-inhibiting device according to claim 1, wherein a pitch of the at least one continuous helical flow guide decreases in the direction of the radial restriction.

3. A method of dampening or inhibiting scaling in a dead zone of a fluid flow downstream of a radial restriction in a pipeline, the fluid flow exhibiting an axial flow velocity wherein the method comprises:

via at least one continuous helical flow guide projecting radially inwards from a pipe wall, providing a peripheral flow velocity at least on a lee side of the radial restriction.

4. The scale-dampening or scale-inhibiting device according to claim 1, wherein the at least one continuous helical flow guide is fixed along a length thereof to the pipe wall.

5. The scale-dampening or scale-inhibiting device according to claim 1, wherein the at least one continuous helical flow guide is configured to provide a first axial flow-velocity component together with a second peripheral flow-velocity component for fluid flowing in the pipeline.

6. The scale-dampening or scale-inhibiting device according to claim 1, wherein the at least one continuous helical flow guide is formed of a series of uninterrupted winding section, and includes an inlet end for directing fluid along the two separate flow paths to an outlet end which is spaced by the pipeline portion from and delivers the fluid at a peripheral flow-velocity on a lee side of the radial restriction via a free exit path therefrom.

7. A scale-dampening or scale-inhibiting device at a radial restriction in a pipeline wherein at least one continuous helical flow guide is arranged in a pipeline portion upstream of the radial restriction, the at least one continuous helical flow guide projecting radially inwards from a pipe wall and having a longitudinal direction slanted relative to a center axis of the pipeline, and wherein a smallest diameter of the at least one continuous helical flow guide is, maximally, equal to a diameter of the radial restriction.

8. The scale dampening or scale-inhibiting device according to claim 7, such that the at least one continuous helical flow guide and multiple radial elevations are fixed to and project radially inwards from the pipe wall.

\* \* \* \* \*